(No Model.) 2 Sheets—Sheet 2.

C. B. CUSHMAN & H. G. CANFIELD.
FARE REGISTER.

No. 472,035. Patented Apr. 5, 1892.

UNITED STATES PATENT OFFICE.

CALVIN B. CUSHMAN AND HORACE G. CANFIELD, OF AKRON, OHIO.

FARE-REGISTER.

SPECIFICATION forming part of Letters Patent No. 472,035, dated April 5, 1892.

Application filed October 2, 1891. Serial No. 407,487. (No model.)

*To all whom it may concern:*

Be it known that we, CALVIN B. CUSHMAN and HORACE G. CANFIELD, citizens of the United States, residing at Akron, in the county of Summit and State of Ohio, have invented a new and useful Fare-Register, of which the following is a specification.

Our invention relates to fare-registers and especially to those in use upon electric railways, in which the electric current is utilized for the purpose of operating the register; and it has for its object to provide a device used in connection with an electric current obtained by any desirable means, but preferably from the ordinary electric-motor cars and operated in a simple manner and by easy manipulation.

To this end the invention consists in certain improvements in devices of this character, which will be hereinafter fully described, illustrated in the accompanying drawings, and specifically pointed out in the appended claim.

Figure 1:
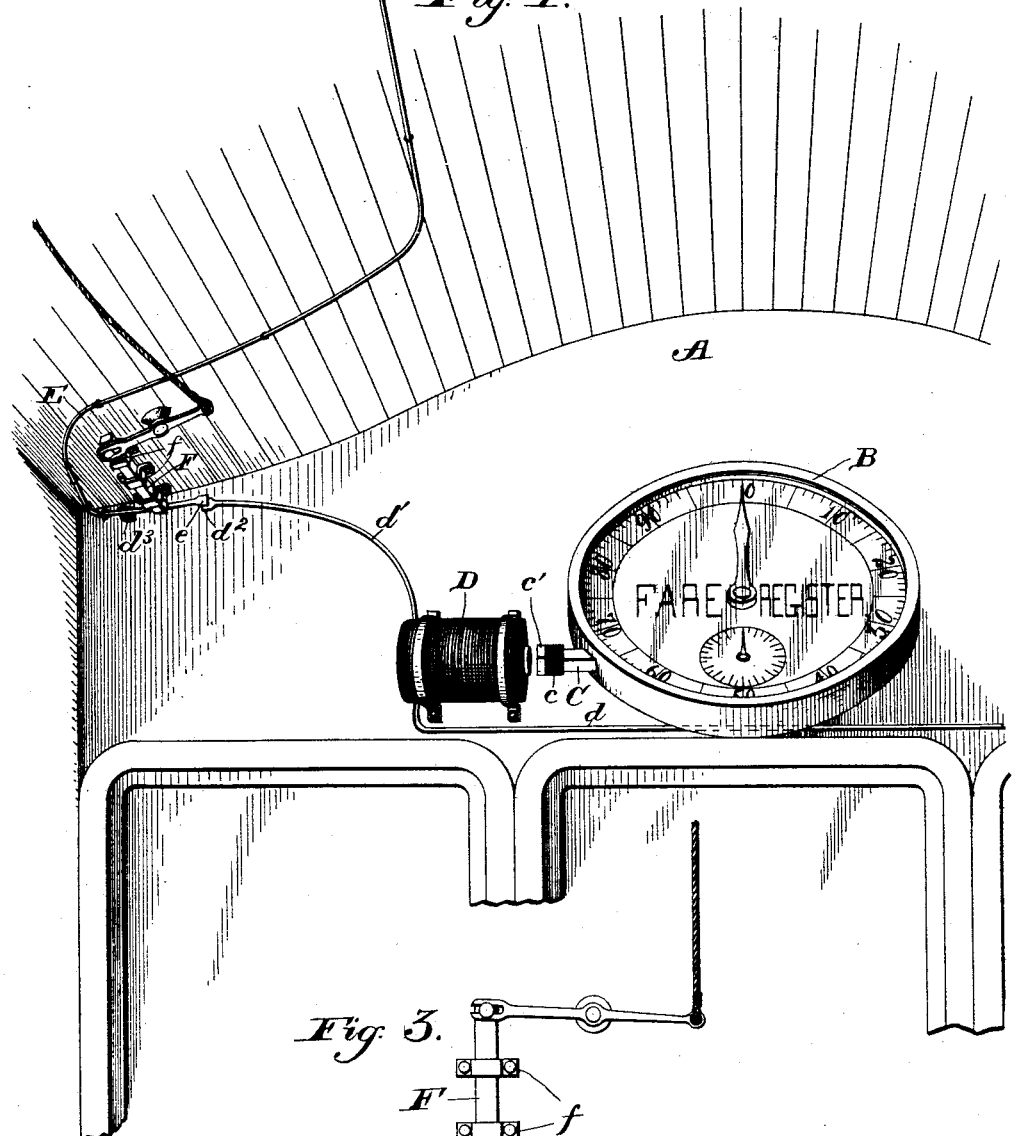
Figure 2:
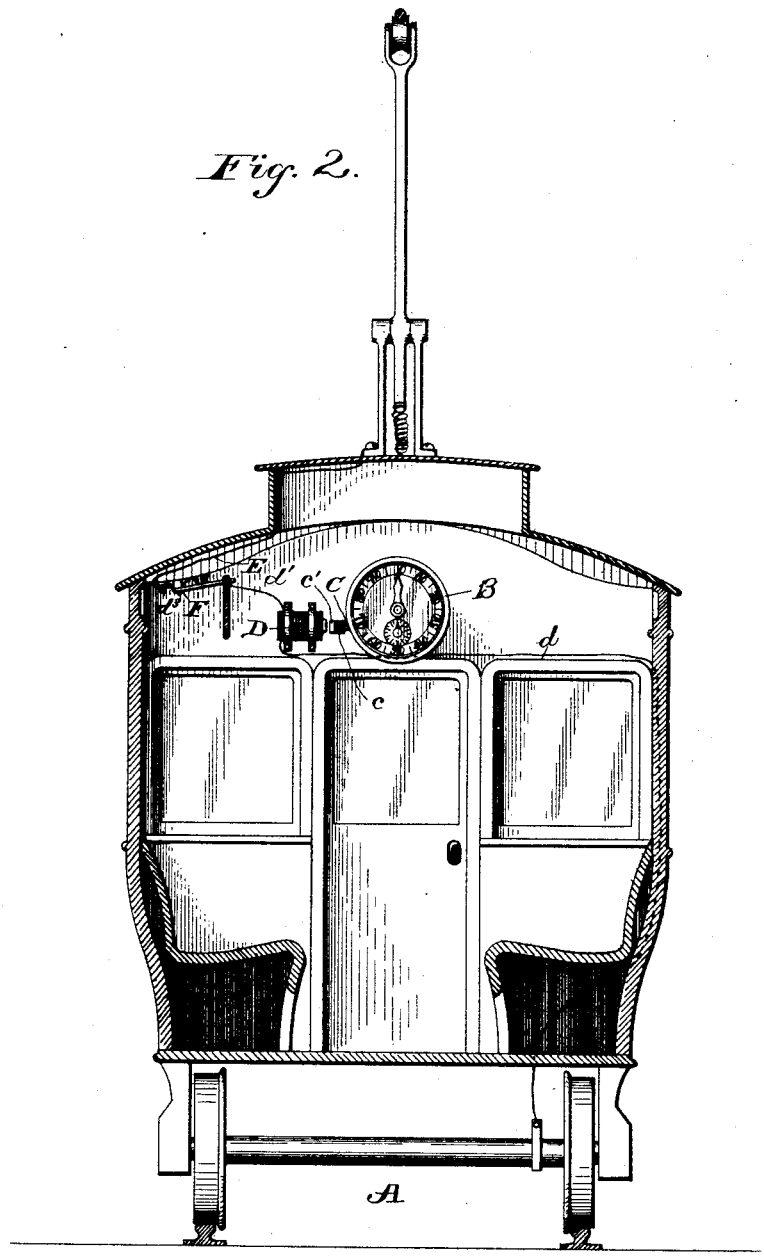

In the accompanying drawings, Figure 1 is an enlarged detail perspective view of a portion of a car provided with a fare-registering apparatus constructed in accordance with our invention. Fig. 2 is a sectional view of an electric-motor car provided with our improved registering apparatus. Fig. 3 is a detail in perspective illustrating the operating-bolt.

Referring to the accompanying drawings, A designates an electric-motor car of the ordinary construction and provided with an ordinary fare-register B, located within the front end of the same in the ordinary manner. The said register is provided with the usual operating-lever C, connected with the interior mechanism of the same and extended without the back thereof, and the said lever terminates in an enlarged head $c$, constructed of hard rubber or other suitable non-conducting material, so that the electric current will not pass through the register when operating the same, and the said head is provided with a cap of soft metal $c'$, which is adapted to be attracted by the electro-magnet D, secured to the end of the car and directly in the path of travel of said operating lever or pull C. The said electro-magnet D consists of a soft-iron center having the usual conducting-wires coiled therearound, the negative end $d$ of which is suitably connected with the running-gear of a motor-car to make the ground connection, while the positive end $d'$ is secured to the end of the car and terminates a short distance from said magnet in a contact end $d^2$, which is normally out of contact with the main wire E, which may be suitably connected with a battery or other generating means, but is preferably connected, as illustrated in Fig. 2, with the trolley of the car, from which the electric current is conducted through said wires to the magnet, which immediately attracts the operating lever or pull of the fare-register when the wires are in circuit. Said electric wire E is provided with a flattened contact end $e$, that is adapted to be normally held out of contact with the contact end $d^2$ of the positive wire $d'$ of the electro-magnet D by means of the non-conducting spring-cushion $d^3$, secured to the end of the car and behind said wire. The said wires may be thrown in contact with each other to close the circuit by the use of straps, cords, or rods, which may be easily reached and controlled by the conductor and which are suitably connected with the sliding bolt F, working within the staples or eyes $f$, secured to the under side of the roof of the car, and which is adapted to bear upon the end of the electric wire E, said bolt or rod being adapted to be actuated, as described, by any suitable means.

The construction and operation of our improved device for electrically operating a fare-register are thought to be apparent without further description.

Having thus described our invention, what we claim, and desire to secure by Letters Patent, is—

The combination, with a fare-register, of the operating-lever provided with an enlarged insulated head having a metallic facing, an electro-magnet located in a line with said lever, the positive wire of the helix terminating in a flattened contact end, a supplemental conducting-wire provided with a flattened contact end directly over the helix-wire, a non-conducting spring-cushion normally pressing said supplemental wire out of circuit with the helix-wire, and a sliding bolt or rod adapted to work against and away from said conducting-wire over its contact end to close and break the circuit when desired, subtantially as set forth.

In testimony that we claim the foregoing as our own we have hereto affixed our signatures in presence of two witnesses.

CALVIN B. CUSHMAN.
HORACE G. CANFIELD.

Witnesses:
R. S. INEDELL,
C. R. GRANT.